(12) United States Patent
Orr et al.

(10) Patent No.: US 6,463,459 B1
(45) Date of Patent: Oct. 8, 2002

(54) SYSTEM AND METHOD FOR EXECUTING COMMANDS ASSOCIATED WITH SPECIFIC VIRTUAL DESKTOP

(75) Inventors: Robert B. Orr, Monroe; Dennis Chimienti, Snohomish; Colby Kinser, Woodinville, all of WA (US)

(73) Assignee: Wall Data Incorporated, Kirkland, WA (US)

( * ) Notice: Subject to any disclaimer, the term of this patent is extended or adjusted under 35 U.S.C. 154(b) by 0 days.

(21) Appl. No.: 09/235,221

(22) Filed: Jan. 22, 1999

(51) Int. Cl.[7] .............................................. G06F 15/16
(52) U.S. Cl. ....................................... 709/203; 709/202
(58) Field of Search ................................ 709/203, 227, 709/228, 315, 316, 317, 331, 1

(56) References Cited

U.S. PATENT DOCUMENTS

| | | | |
|---|---|---|---|
| 4,791,566 A | * 12/1988 | Sudama et al. .............. 364/200 |
| 5,329,619 A | 7/1994 | Pagé et al. |
| 5,421,009 A | 5/1995 | Platt |
| 5,553,242 A | * 9/1996 | Russell et al. .......... 395/200.12 |
| 5,564,002 A | * 10/1996 | Brown ......................... 395/155 |
| 5,689,638 A | 11/1997 | Sadovsky |
| 5,696,901 A | 12/1997 | Konrad |
| 5,732,275 A | 3/1998 | Kullick et al. |
| 5,734,871 A | 3/1998 | Kleinerman et al. |
| 5,764,639 A | 6/1998 | Staples et al. |
| 5,764,992 A | 6/1998 | Kullick et al. |
| 5,771,353 A | 6/1998 | Eggleston et al. |
| 5,805,805 A | 9/1998 | Civanlar et al. |
| 5,812,552 A | 9/1998 | Arora et al. |
| 5,812,768 A | 9/1998 | Pagé et al. |
| 5,822,585 A | * 10/1998 | Noble et al. ................. 395/680 |
| 5,949,975 A | * 9/1999 | Batty et al. ................... 709/219 |
| 5,961,582 A | * 10/1999 | Gaines ........................... 709/1 |
| 6,003,065 A | * 12/1999 | Yan et al. ..................... 709/201 |
| 6,003,067 A | * 12/1999 | Suzuki et al. ................ 709/204 |
| 6,012,083 A | * 1/2000 | Savitzky et al. ............. 709/202 |
| 6,078,948 A | * 6/2000 | Podgorny et al. ............ 709/204 |
| 6,088,435 A | * 6/2000 | Barber et al. ................ 379/205 |
| 6,115,744 A | * 9/2000 | Robins et al. ............... 709/227 |
| 6,122,637 A | * 9/2000 | Yohe et al. .................. 707/103 |
| 6,166,734 A | * 10/2000 | Nahi et al. ................... 345/335 |
| 6,204,847 B1 | * 3/2001 | Wright ......................... 345/346 |
| 6,247,056 B1 | * 6/2001 | Chou et al. .................. 709/229 |
| 6,259,701 B1 | * 7/2001 | Shur et al. ..................... 70/401 |
| 6,285,363 B1 | * 9/2001 | Maires et al. ............... 345/331 |

OTHER PUBLICATIONS

Prasash et al., "DistView: Support for Building Efficient Collaborative Applications using Rplicated Objects", Chapel Hill, 1994 pp. 153–164.*

* cited by examiner

*Primary Examiner*—Robert B. Harrell
*Assistant Examiner*—Bunjob Jaroenchonwanit
(74) *Attorney, Agent, or Firm*—Christensen O'Connor Johnson Kindness PLLC

(57) ABSTRACT

A system and method for executing commands on a specific virtual desktop operating in a multi-user server environment. The present invention provides a system and method for executing commands associated with a specific virtual desktop. A virtual process broker (20) running on a server communicates with a remote requester and multiple virtual desktops. A virtual process agent (24) running in each of the virtual desktops communicates with the virtual process broker. A virtual desktop identifier is assigned to each of the virtual desktops and communicated to the virtual process broker. The virtual process broker records a status for the virtual desktop identifier in a virtual process broker database. Later, a remote requester such as a remote system or a virtual desktop generates a command request that is received by the virtual broker. The virtual broker determines whether the user associated with the command request is currently logged in by querying the virtual process broker database. If the user is logged in and the command request needs the first virtual desktop to perform some action, the virtual process broker forwards the request to the virtual process agent associated with the command request. The virtual process agent then initiates any actions requested in the command request.

17 Claims, 5 Drawing Sheets

SYSTEM AND METHOD FOR EXECUTING COMMANDS ASSOCIATED WITH SPECIFIC VIRTUAL DESKTOP

FILED OF THE INVENTION

The present invention relates to executing commands associated with a specific computer, and in particular, to systems and methods for executing commands on a specific virtual desktop operating in a multi-user server environment.

BACKGROUND OF THE INVENTION

Networked computers that share information and resources have become commonplace today. The computers may be in networks that range from a small local area network with a few computers to a large network distributed over a vast geographic area with many computers. The networked computers communicate over a communication link such as coaxial or fiber optic cable.

The client/server architecture is commonly used for communicating between the networked computers. In a client/server architecture, a server is an application that offers a service to other applications residing on networked computers. Whereas, a client is a requester of such service. Therefore, an application consists of both a server and a client part which may run either on the same computer or on different computers residing on the network. This architecture allows processing to be distributed among the networked computers. Typically, a user on a client logs on to a server and invokes a client part of the application that builds the request for a particular service. The client part of the application then sends the request to the server part of the application. At the server, the request is received and the required service is performed. The results of the performed service are sent back to the client part of the application in a reply. Each user may have multiple client/server sessions in operation at one time. However, the user only needs one screen to control all the sessions.

Another client/server architecture has emerged called the thin-client/server computing architecture. In a thin-client/server computing architecture, the majority of the processing occurs on the server. The client is typically only involved with displaying the user interface and processing keyboard and mouse events and forwarding them to the server. Because the thin-client does not perform intense processing, the software and hardware requirements for the thin-client are minimized, thus reducing costs. Typically, in this architecture, multiple concurrent users log on and run applications in separate, protected sessions on a single server. Each separate, protected session is called a virtual desktop. Therefore, one user may be associated with multiple virtual desktops being displayed on one client, thus needing only one screen to control all virtual desktops.

Even though the thin-client/server architecture is a highly desirable and costeffective architecture, a disadvantage of the thin-client/server architecture is that users on remote computers or other virtual desktops cannot execute commands associated with a specific virtual desktop. For example, in some situations, such as in the insurance industry, adjusters in the field need to access information from a host computer that is typically remotely located at the office or at a central branch office. In the prior client/server architecture where each client is a separate computer, a user using an input device on a client enters a user name and password that gets transmitted to a host computer. After the host computer verifies the user name and password, the host computer initiates communication with a server over the network. The server identifies the client (user) desktop using a unique network identifier, such as an Internet Protocol (IP) address or a Media Access Control (MAC) address. The server then starts an application to run on the client. Typically, in this client/server architecture, ports and sockets are used to uniquely identify connections between the server and multiple clients. Both the server and the client have a socket. A socket is an endpoint on a communication link between two processes. Each socket uses the IP address along with other identifiers to uniquely identify the connection. Because the client is a separate computer with its own processing capabilities, the auto-started application runs on the client and retrieves necessary information from the host. Therefore, server processes are able to manage multiple conversations through a single port. However, in the thin-client/server architecture, the server does not have any mechanism to uniquely identify a particular user with a virtual display, access the specific virtual display, and execute commands associated with the specific virtual display. The prior techniques to auto-start an application in a client/server architecture are not applicable in the thin-client/server architecture.

Therefore, there is a need for a system and method for executing commands associated with a server for a specific virtual desktop in a multi-user server environment.

SUMMARY OF THE INVENTION

The present invention provides a system and method for executing commands associated with a specific virtual desktop. A virtual process broker running on a server communicates with a remote requester and multiple virtual desktops. A virtual process agent runs in each of the virtual desktops and communicates with the virtual process broker. A virtual desktop identifier is assigned to each of the virtual desktops and communicated to the virtual process broker. The virtual process broker records a status for the virtual desktop identifier in a virtual process broker database. Later, a remote requester such as a remote system or a virtual desktop generates a command request that is received by the virtual broker. The virtual broker determines whether the user associated with the command request is currently logged in by querying the virtual process broker database. If the user is logged in and the command request needs the first virtual desktop to perform some action, the virtual process broker forwards the request to the virtual process agent associated with the command request. The virtual process agent then initiates any actions requested in the command request.

BRIEF DESCRIPTION OF THE DRAWINGS

The foregoing aspects and many of the attendant advantages of this invention will become more readily appreciated as the same become better understood by reference to the following detailed description,. when taken in conjunction with the accompanying drawings, wherein.

DETAILED DESCRIPTION OF THE PREFERRED EMBODIMENT

Figure 1:
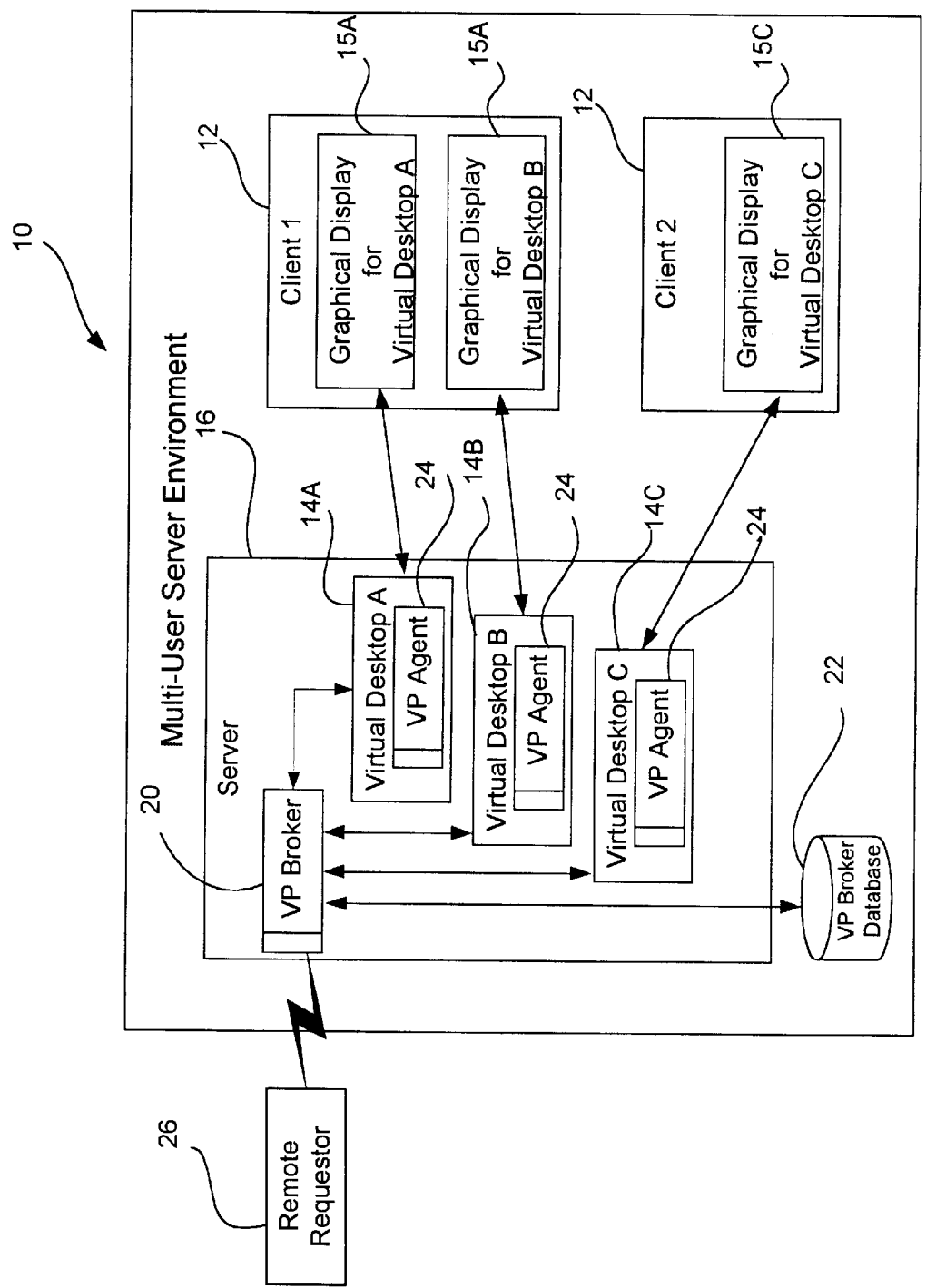
FIG. 1 is a block diagram of a multi-user server environment suitable for implementing the present invention.

In accordance with the present invention, a remote requester may initiate a command to run on a server for an associated virtual desktop. With reference to FIG. 1, an exemplary system 10 for implementing the invention includes one or more clients 12 coupled to one or more servers 16. Typically, each client 12 includes a processor, a keyboard, a directional input device such as a mouse, and a monitor, such as a cathode ray tube (CRT) or a liquid crystal display (LCD). The client further includes a computer readable media for storing programs that are executed by the client 12 and a graphical user interface for displaying information on the monitor. An example of a graphical user interface is the WINDOWS® operating system produced by the Microsoft Corporation. The server 16 may be a personal computer or host computer having the elements of the client 12 as described above.

In one embodiment, the system 10 is operating in a multi-user server environment using a thin-client/server computing architecture. The server 16 runs a multi-user server application such as the WINDOWS NT Server 4.0, Terminal Server Edition operating system produced by the Microsoft Corporation or a Citrix Winframe Server produced by Citrix® Systems, Inc. The multi-user server application is responsible for session management, initiation, and termination of virtual desktops and session event notifications. The multi-user server application uses a protocol, such as Remote Desktop Protocol (RDP) or INDEPENDENT COMPUTING ARCHITECTURE® (ICA), a trademark of Citrix® Systems, Inc. In addition, the server runs a Systems Network Architecture (SNA) protocol stack, such as in the commercially available RUMBA® software produced by Wall Data Incorporated.

For the present invention, each time a user logs on to a client 12, a virtual desktop, such as 14A, 14B, 14C, is created. In the described embodiment, a virtual desktop is any user logged on session in a multi-user server environment. For a thin-client/server architecture, processing for the virtual desktop is performed in the server and the graphical display for the virtual desktop is provided by the thin-client. A first process, a virtual process broker (VP broker) 20, executes on the server 16 and communicates with a second process, a virtual process agent (VP agent) 24, also executing on the server 16. The VP agent 24 is started within each virtual desktop. The VP agent 24 may be automatically started at log-on by including the process in the start-up sequence or may be started at a later time by user intervention. Once the VP agent 24 is started, the VP agent 24 communicates with the VP broker 20 executing on the server 16, as will be described in more detail below. As one skilled in the art will appreciate, the server must be running before a client may log-on and establish a virtual desktop. Therefore, the VP broker 20 is typically started automatically when the server 16 is booted. However, the VP broker 20 may be started at a later time if desired.

The VP broker 20 stores communicated information from the VP agents 24 and static information in a virtual process broker database 22. The virtual process broker database 22 is stored in non-volatile storage such as a hard disk, flash memory, or floppy disk. When the server 16 receives a command request from a remote requester 26, such as a remote host or one of the virtual desktops 14A, 14B, 14C, the server 16 directs the command request to the VP broker 20 which queries the VP broker database 22 to determine whether the requested user specified in the command request is logged on. If the requested user is logged on, the VP broker 20 determines the virtual desktop associated with the requested user. This process will be described in greater detail below.

Figure 2:
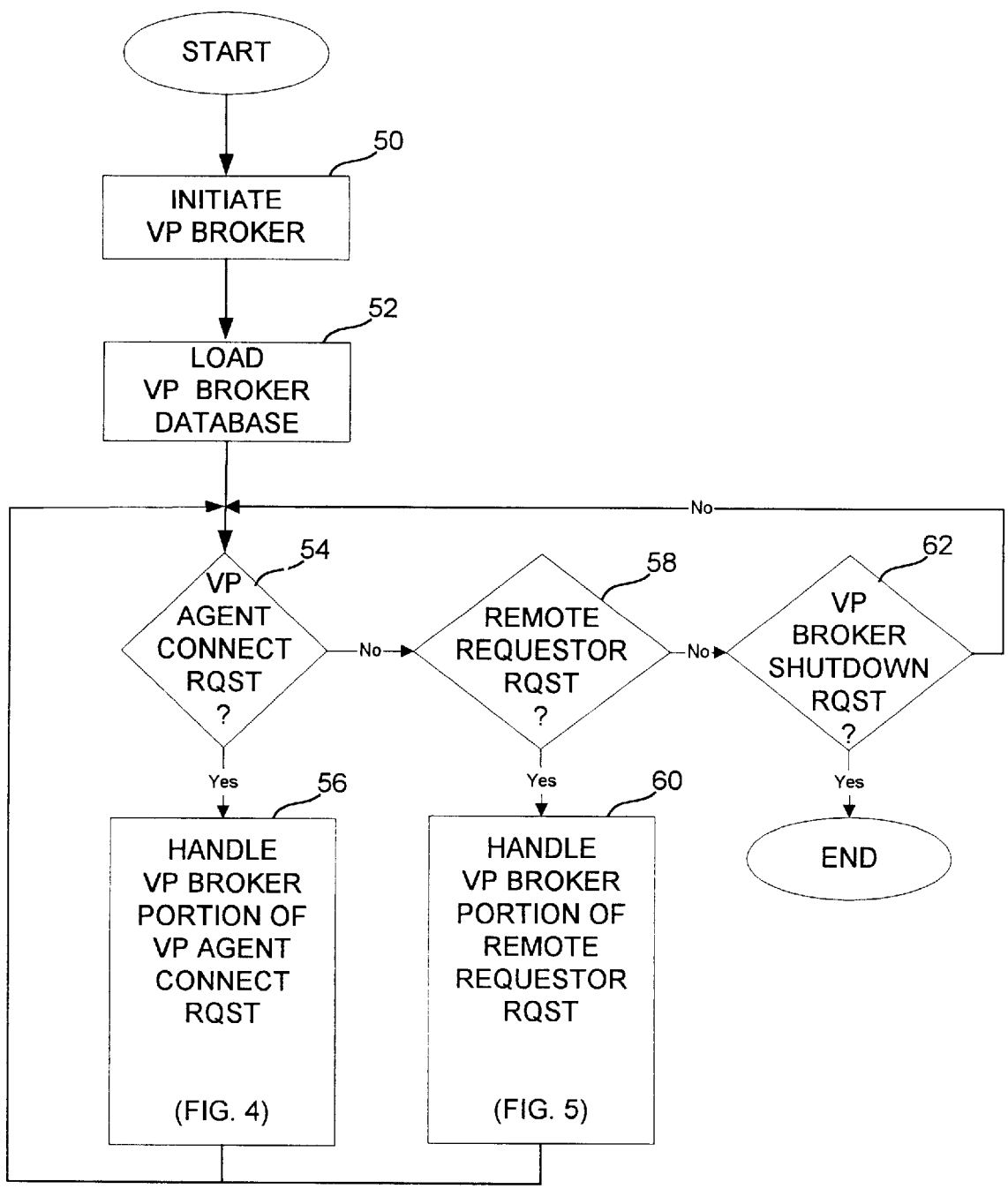
FIG. 2 is a flow diagram illustrating a process for the virtual process broker suitable for use in the block diagram shown in FIG. 1.

FIG. 2 is a flow diagram that illustrates the processing for the VP broker 20 residing in the server 16. At block 50, the VP broker is initiated. Typically, this occurs when the server boots by including the VP broker 20 in the startup. However, the VP broker 20 may be initiated and controlled by user interaction with the operating system, such as when a user selects an associated icon. Once initiated, the VP broker loads the VP broker database at block 52. As one skilled in the art will appreciate, the VP broker database may be loaded at a later time such as when the VP broker needs to update or query the VP broker database. The VP broker database includes static fields for storing a user name and a unique identifier. The unique identifier may be a user name or a text string associated with the user. The VP broker may create a unique identifier for each virtual desktop, even when two virtual desktops have the same user logged in with the same user name. For example, in the embodiment described above, SNA Local Logical Unit Names may be the unique identifier. SNA Local Logical Unit Names are unique strings that identify a user in the network. The VP broker database further includes a status field for indicating whether a user is currently logged on and active. Before any VP agents are started in the virtual desktops, all the status fields indicate logged off Once the VP broker is initiated, the VP broker waits for one of several requests. Once a request is received, the VP broker determines whether the request is a VP agent connect request, at decision block 54. If the request is a VP agent connect request, the logic proceeds to block 56 where the VP broker handles a portion of the VP agent connect request. The processing occurring in block 56 will be described in greater detail later with reference to FIG. 3. Returning to decision block 54, if the VP broker determines that the request was not a VP agent connect request, the logic proceeds to decision block 58. At decision block 58, the VP broker determines whether the request is a remote requester request. If the request is a remote requester request, the VP broker logic proceeds to block 60 where the VP broker handles the VP broker portion of the remote requester request. Handling the remote requester request will be described in greater detail with reference to FIG. 4.

Returning to decision block 58, if the VP broker determines that the request was not a remote requester request, the VPbroker logic proceeds to decision block 62. At decision block 62, the VP broker determines whether the request is a VP broker shut down request. If the request is a VP broker shutdown request, the VP broker processing ends. If this occurs and the VP broker service is needed later, the logic must begin at block 50 to initiate the VP broker. Returning to decision block 62, if the request is not a VP broker shutdown request, the logic returns to decision block 54 and proceeds as described above. As one skilled in the art will appreciate, the order for determining the type of request may be modified without departing from the scope of the present invention.

Figure 3:
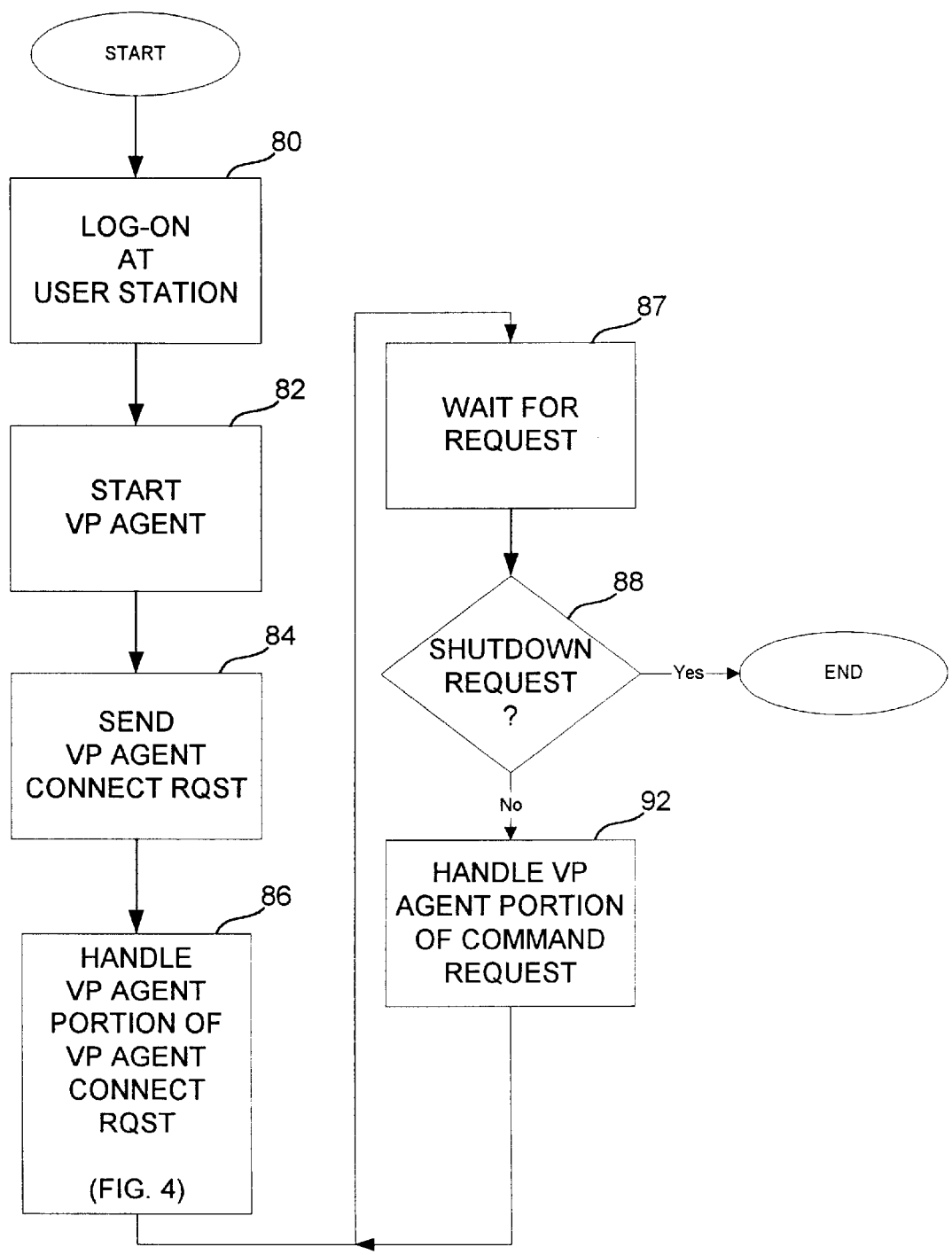
FIG. 3 is a flow diagram illustrating a process for the virtual process agent suitable for use in the block diagram shown in FIG. 1.

Now, referring to FIG. 3, a flow diagram illustrates the processing performed by the VP agent 24 residing in the server 16. At block 80, a user logs on at the client. Typically, when a user logs on, a connection from the client to the server is initiated through a communication channel. The types of communication channel used when logging on to the server is, dependent on the multi-user server operating system. The server detects a session request and creates any new operating system dependent resources to handle the new session request.

In addition to the normal operating system dependent processes that are started during log-on, the present invention invokes a VP agent at block 82. As one skilled in the art will appreciate, it is not necessary to start the VP agent at log on, but rather could be started at a later time through user control. After the VP agent is started, the logic proceeds to block 84 where the VP agent sends a VP agent connect request to the VP broker using an interprocess communication mechanism such as shared memory. This shared memory is available for VP agents to use for communicating with the VP broker until dedicated interprocess communication resources are provided. A locking mechanism restricts access to the shared memory. In the present embodiment, a VP agent uses a mutex as the locking mechanism to restrict communication using the shared memory to one VP agent at a time.

After sending the VP agent connect request, the VP agent logic proceeds to block 86 where the VP agent handles a portion of the VP agent connect request. The processing in block 86 will be described in more detail in reference to FIG. 4. After handling the VP agent connect request, the VP agent waits for a request at block 87. Once a request is received, the logic proceeds to decision block 88 where the VP agent determines whether the request is a VP agent shutdown request. If the shut-down request is received at decision block 88, the VP agent ends processing. If the VP agent is needed later, the logic may cycle back to either block 80 or 82 depending on whether a virtual desktop is already created.

Returning to decision block 88, if the request is not a VP agent shutdown request, the VP agent determines whether the request is a command request. The logic then proceeds to block 92 where the VP agent initiates the processing requested in the command request. Typical command requests include initiating a desired application to run on the server for a specific virtual desktop and displaying the results on the specific virtual desktop, initiating a dialog box to display on a specific virtual desktop, or initiating any number of actions associated with a specific virtual desktop. For example, in the earlier described example, the command request may originate from a computer displaying a virtual desktop for an insurance adjuster in the field. The command request may start an application on the server that will provide information to the insurance adjuster through another virtual desktop displaying on the insurance adjuster's same computer. After the command request is handled, the logic returns to waiting for a request at block 87 and proceeds as previously described.

Figure 4:
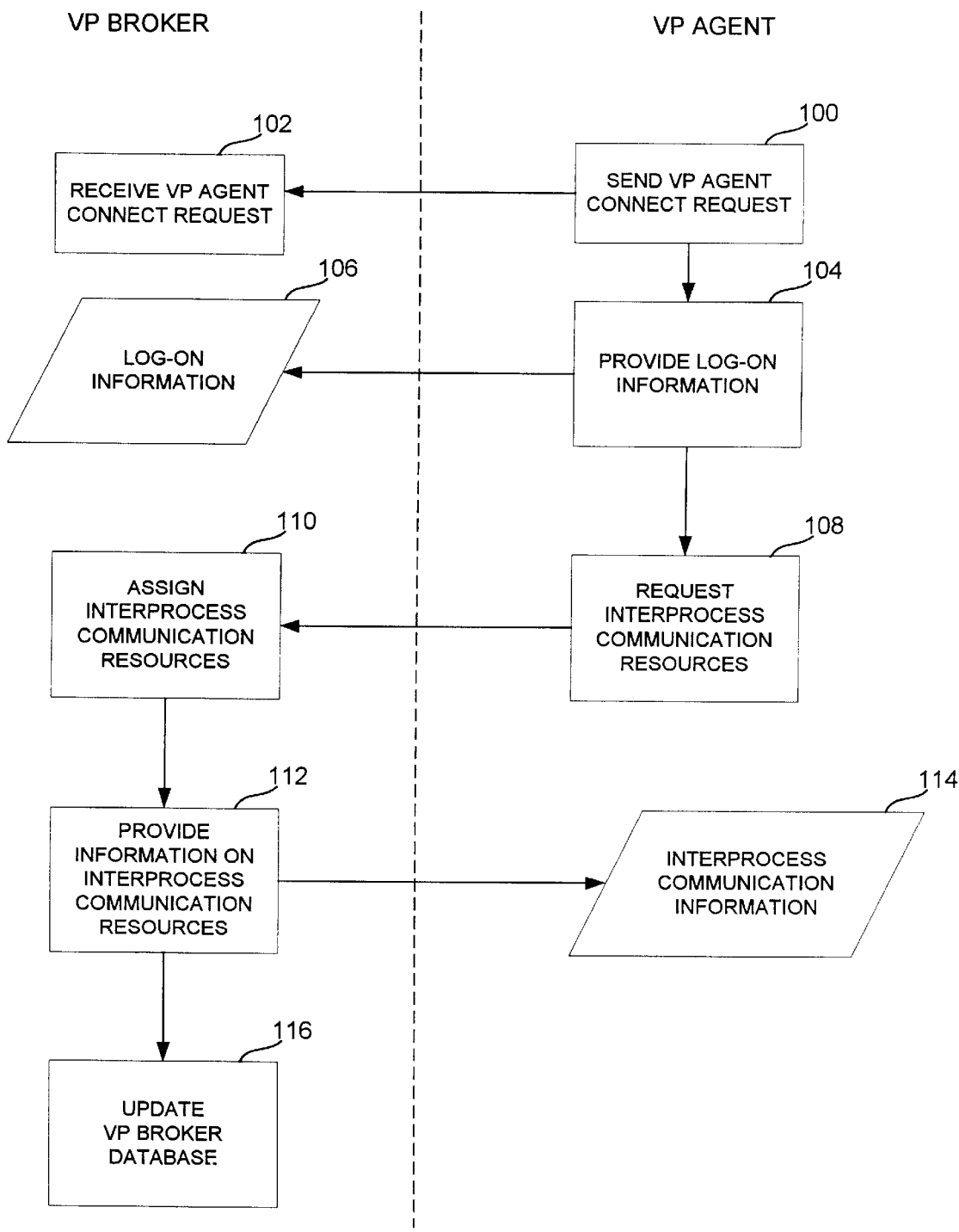
FIG. 4 is a flow diagram illustrating a process for handling a virtual process agent connect request suitable for use in the processes shown in FIGS. 3 and 4.

Now, referring to FIG. 4, a flow diagram illustrating a process of handling the VP agent connect request suitable for use in process block 56 shown in FIG. 2 and process block 86 shown in FIG. 3 is illustrated in more detail. As described above, the VP agent sends a VP agent connect request to the VP broker. See block 100. At block 102, the VP broker receives the VP agent connect request. The VP agent then provides log-on information at block 104 to the VP broker. This log-on information includes a user name. The VP broker temporarily stores the logon information at block 106 and may record some of the information later in the VP broker database.

Once log-on information is sent to the VP broker, the VP agent requests interprocess communication resources from the VP broker. See block 108. Upon receipt of the request for interprocess communication resources, the VP broker assigns interprocess communication resources for the new VP agent at block 110. The VP broker then provides the assigned interprocess communication resources to the VP agent. See block 112. At block 114, the VP agent stores the assigned interprocess communication resources so that these resources may be used to communicate with the VP broker. In the above described embodiment, the interprocess communication resources include shared memory buffers and dedicated events. The shared memory buffers are used to pass information between the VP broker and the VP agent and the events are used to signal completion. As one skilled in the art will appreciate, the interprocess communication resources is dependent on the operating system being used and the type of interprocess communication desired.

Once the VP broker provides the interprocess communication resources to the VP agent, the VP broker logic proceeds to block 116 where the VP broker updates the VP broker database with an active status for. the specified user name. As briefly mentioned earlier, other fields in the database, static fields, are only changed by a system administrator responsible for allowing users access to incoming command requests. In this manner, the system administrator maintains control over the applications that may run on a client when certain users are logged on. Preferably, the system administrator assigns a unique identifier for each virtual desktop. In addition, the system administrator may provide additional security features without departing from the scope of the present invention.

Figure 5:
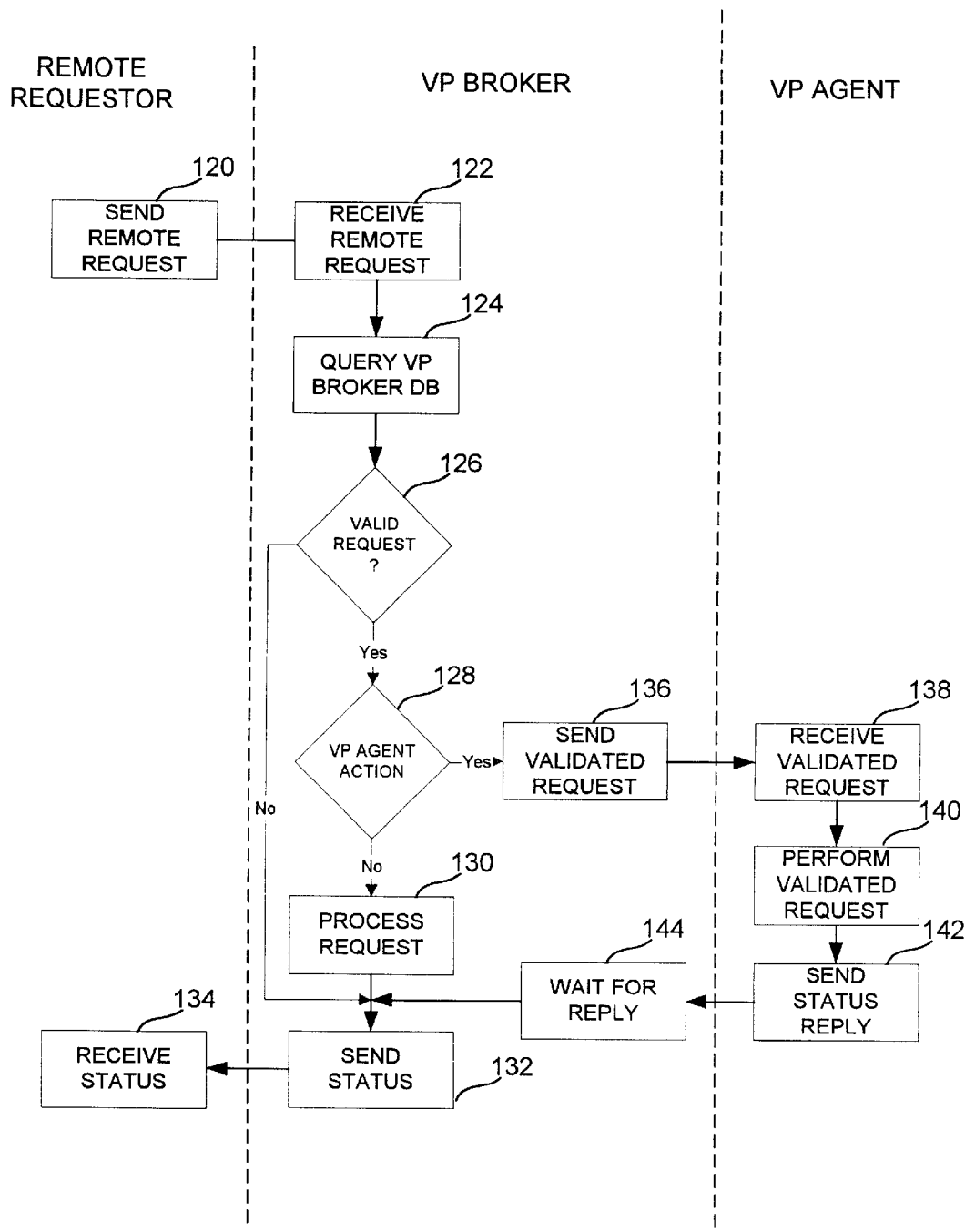
FIG. 5 is a flow diagram illustrating a process for handling a remote requester request suitable for use in the process shown in FIG. 2.

Once the VP agent is connected to the VP broker, the VP broker is ready to handle the request or direct requests to a specified VP agent. FIG. 5 is a flow diagram for a process for handling a remote requester request suitable for use in process block 60 illustrated in FIG. 2 and in process block 92 illustrated in FIG. 3. At block 120, the VP broker receives a remote request from a remote requester. The remote requester may be a remote system connected over a network or an application executing on a virtual desktop. The virtual desktop may reside on the same or different client. If the remote request is from a remote system connected over a network, the server passes the request to the VP broker using a communication method well-known in the art, such as using the Distributed Component Object Model (DCOM).

The remote request may be a request to start an application, display a dialog, or execute any command for a specific virtual desktop. The remote request includes a type identifier that identifies the type of operation to be performed, a unique identifier that associates the user for which the operation is to be performed, and variable data fields that depend on the type of operation. The variable data fields may include a name of an application, status fields, and result fields. Upon receipt of the remote request at block 122, the VP broker proceeds to block 124 where the VP broker queries the VP broker database based on the remote request. The query attempts to locate a record containing the unique identifier. Once a requested record is found or the complete database is searched, the VP broker validates the remote request. See block 126. Validating the request includes determining whether the status field associated with the user is active or inactive. If the status field is inactive (associated user is not currently logged on), the VP broker proceeds to block 132 where the VP broker sends status indicating an error to the remote requester. Other invalid requests include a remote requester not authorized to request the specified unique identifier. Again, the logic will proceed to block 132 and proceed as previously described.

Returning to decision block 126, if the VP broker determines that the request is valid, the VP broker determines whether the remote request requires VP agent action. See block 128. If the request does not require VP agent action, the logic proceeds to block 130 where the VP broker processes the request. Typical processing occurring in block 130 includes determining whether a particular user is logged on into the system or determining how many users are logged into the system. The latter is useful in implementing an automated licensing service. The logic then proceeds to block 132 as previously described and sends the appropriate status.

Returning to decision block 128, if the VP broker determines that VP agent action is needed, the VP broker sends a validated request at block 136 to the VP agent. Upon receipt by the VP agent of the validated request (see block 138), the VP agent initiates the processing requested in the validated request at block 140. Typical validated requests may include starting an application, displaying a dialog box, or executing any commands associated with a specific virtual desktop. After the validated request is complete, the VP agent sends a status reply to the VP broker (see blocks 142, 144). Next, at block 132, the VP broker sends the appropriate status back to the remote requester. See block 134. As the earlier example described, the remote requester (insurance adjuster) may now view the information generated by an application that was initiated to run on a server and to display on the insurance adjuster's specified virtual desktop.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for executing actions on a plurality of virtual desktops running on a server computer, the method comprising:

running the plurality of virtual desktops on the server computer, each of the virtual desktops being unable to communicate directly with each other;

running a virtual broker on the server computer;

running within each of the plurality of virtual desktops a virtual agent that communicates with the virtual broker;

receiving a command at the server computer to initiate an action associated with a selected virtual desktop of the plurality of virtual desktops:

forwarding the command to the virtual broker:

determining at the virtual broker whether the selected virtual desktop associated with the command is available; and if the selected virtual desktop associated with the command is available, sending a request to the virtual agent associated with the command to execute the command.

2. The method of claim 1, wherein the step of determining at the virtual broker whether the virtual desktop associated with the command is available comprises:

providing a database having entries for storing a user name field, an identifier field, and a status field;

finding an entry in the database associated with the command by locating the entry having the identifier field associated with the command;

determining whether the status field for the entry associated with the command contains a logged in indication; and if so, providing an available indication for that virtual desktop.

3. The method of claim 2, wherein the step of finding an entry in the database associated with the command by locating the entry having the identifier field associated with the command comprises comparing a SNA Local Logical Unit Name stored in the identifier field with a SNA Locigal Unit Name stored in the command.

4. A method for executing commands associated with one of a plurality of virtual desktops in a multi-user server environment, the method comprising:

(a) running a first process on a server capable of communicating with a remote requester and the plurality of virtual desktops;

(b) running a second process in at least one of the plurality of virtual desktops that communicates with the first process;

(c) providing a virtual desktop identifier to the first process, for each of the virtual desktops running the second process;

(d) recording a status for the virtual desktop identifier in a database;

(e) receiving a command request in the first process that was preprocessed by the server;

(f) determining the status for the virtual process identifier associated with the command request based on an entry in the database; and (g) initiating actions requested in the command request.

5. The method of claim 4, wherein the step of running a second process in at least one of the plurality of virtual desktops that communicates with the first process comprises communicating using an interprocess communication protocol.

6. The method of claim 4, wherein the step of recording a status for the virtual desktop identifier in a database comprises:

(a) creating the entry comprising a user name field, an identifier field, and a status field;

(b) storing a user name in the user name field;

(c) storing a unique identifier in the identifier field; and (d) locating the entry associated with the virtual desktop identifier received from the second process; and (e) storing a logged in value in the status field.

7. The method of claim 6, wherein the step of determining a status for the virtual desktop identifier associated with the command request based on an entry in the database comprises:

(a) locating the entry in the database associated with the command request; and (b) determining whether the status field for the associated entry contains the logged in value.

8. The method of claim 6, wherein the step of storing a unique identifier in the identifier field comprises storing a SNA Local Logical Unit Name as the unique identifier in the identifier field.

9. A system for executing commands associated with one of a plurality of virtual desktops in a multi-user server environment, comprising:

a first process running on a server capable of communicating with a remote requester and the plurality of virtual desktops;

a second process running in at least one of the plurality of virtual desktops that communicates with the first process;

a virtual desktop identifier provided by the first process for each of the virtual desktops running the second process;

a status for the virtual desktop identifier;

a database having entries for recording the status for the virtual desktop identifier;

a command request received by the first process; and wherein the first process determines the status for the virtual desktop identifier associated with the command request by locating an entry in the database corresponding to the virtual desktop identifier, and upon finding an entry in the database associated with the command request, initiates actions requested in the command request.

10. The system of claim 9, wherein the second process communicates with the first process using an Interprocess Communication Protocol.

11. The method of claim 9, wherein the database comprises:

a user name field for storing a user name;

an identifier field for storing a unique identifier; and a status field for storing a logged-in value when the virtual desktop identifier is received from the second process.

12. The method of claim 11, wherein the unique identifier is a SNA Local Logical Unit Name.

13. In a multi-user server environment, a computer-readable medium holding instructions for performing a method for executing commands associated with one of a plurality of virtual desktops, the method comprising:

(a) running a first process on a server capable of communicating with a remote requester and the plurality of virtual desktops;

(b) running a second process in at least one of the plurality of virtual desktops that communicates with the first process;

(c) providing a virtual desktop identifier to the first process for each of the virtual desktops running the second process;

(d) recording a status for the virtual desktop identifier in a database;

(e) receiving a command request in the first process that was preprocessed by the server;

(f) determining the status for the virtual process identifier associated with the command request based on an entry in the database; and (g) initiating actions requested in the command request.

14. The computer-readable medium of claim 13, wherein the step of running a second process in at least one of the plurality of virtual desktops that communicates with the first process comprises communicating using an interprocess communication protocol.

15. The computer-readable medium of claim 13, wherein the step of recording a status for the virtual desktop identifier in a database comprises:

(a) creating the entry comprising a user name field, an identifier field, and a status field;

(b) storing a user name in the user name field;

(c) storing a unique identifier in the identifier field; and (d) locating the entry associated with the virtual desktop identifier received from the second process; and (e) storing a logged in value in the status field.

16. The computer-readable medium of claim 15, wherein the step of determining a status for the virtual desktop identifier associated with the command request based on an entry in the database comprises:

(a) locating the entry in the database associated with the virtual desktop identifier received from the second process; and (b) determining whether the status field contains the logged in value.

17. The computer-readable medium of claim 15, wherein the step of storing a unique identifier in the identifier field comprises storing a SNA Local Logical Unit Name as the unique identifier in the identifier field.

* * * * *

UNITED STATES PATENT AND TRADEMARK OFFICE
CERTIFICATE OF CORRECTION

PATENT NO.     : 6,463,459 B1
DATED          : October 8, 2002
INVENTOR(S)    : R.B. Orr et al.

It is certified that error appears in the above-identified patent and that said Letters Patent is hereby corrected as shown below:

<u>Title page,</u>
Item [56], References Cited, OTHER PUBLICATIONS, "using Rplicated" should read -- Using Replicated --

<u>Column 7,</u>
Line 48, "desktops:" should read -- desktops; --
Line 49, "broker:" should read -- broker; --

<u>Column 8,</u>
Line 20, "process, for" should read -- process for --

Signed and Sealed this

Sixth Day of May, 2003

JAMES E. ROGAN
*Director of the United States Patent and Trademark Office*